United States Patent
Alric et al.

(10) Patent No.: US 9,133,285 B2
(45) Date of Patent: Sep. 15, 2015

(54) CURABLE COMPOSITION COMPRISING A SILANE-GRAFTED POLYMER AND A LATENT COMPOUND

(75) Inventors: Jérôme Alric, L'Isle d'Abeau (FR); Olivier Pinto, Lyons (FR); Jean-Michel Marty, Sainte Foy les Lyon (FR); Mikael Abeguile, Chaponost (FR)

(73) Assignee: NEXANS, Paris (FR)

( * ) Notice: Subject to any disclaimer, the term of this patent is extended or adjusted under 35 U.S.C. 154(b) by 562 days.

(21) Appl. No.: 12/634,015

(22) Filed: Dec. 9, 2009

(65) Prior Publication Data
US 2010/0160571 A1  Jun. 24, 2010

(30) Foreign Application Priority Data
Dec. 22, 2008 (FR) .................. 08 58920

(51) Int. Cl.
| | |
|---|---|
| C08F 2/48 | (2006.01) |
| C08J 3/28 | (2006.01) |
| C08F 8/00 | (2006.01) |
| C08F 8/42 | (2006.01) |
| C08F 10/00 | (2006.01) |
| C08J 3/22 | (2006.01) |
| C08J 3/24 | (2006.01) |
| C08K 5/00 | (2006.01) |
| C08L 23/08 | (2006.01) |
| C08L 43/04 | (2006.01) |
| C08L 51/06 | (2006.01) |
| C08F 230/08 | (2006.01) |
| C08K 5/56 | (2006.01) |
| C08K 5/57 | (2006.01) |
| C08K 3/22 | (2006.01) |

(52) U.S. Cl.
CPC ... *C08F 8/00* (2013.01); *C08F 8/42* (2013.01); *C08F 10/00* (2013.01); *C08J 3/226* (2013.01); *C08J 3/24* (2013.01); *C08J 3/247* (2013.01); *C08J 3/28* (2013.01); *C08K 5/0025* (2013.01); *C08L 23/0892* (2013.01); *C08L 43/04* (2013.01); *C08L 51/06* (2013.01); *C08F 230/08* (2013.01); *C08F 2810/20* (2013.01); *C08J 2351/06* (2013.01); *C08K 5/0091* (2013.01); *C08K 5/56* (2013.01); *C08K 5/57* (2013.01); *C08K 2003/2224* (2013.01); *C08L 2312/08* (2013.01)

(58) Field of Classification Search
USPC .................. 522/99, 148, 65, 66, 67, 31, 32
See application file for complete search history.

(56) References Cited

U.S. PATENT DOCUMENTS

| | | | | |
|---|---|---|---|---|
| 3,646,155 | A * | 2/1972 | Scott et al. | 525/288 |
| 4,101,513 | A * | 7/1978 | Fox et al. | 522/31 |
| 5,047,476 | A | 9/1991 | Keogh | |
| 5,416,165 | A * | 5/1995 | Okimura et al. | 525/209 |
| 5,498,666 | A * | 3/1996 | Nambu et al. | 525/100 |
| 6,204,350 | B1 | 3/2001 | Liu et al. | |
| 6,255,392 | B1 * | 7/2001 | Inoue et al. | 525/101 |
| 2004/0167293 | A1 | 8/2004 | Palmlof et al. | |

FOREIGN PATENT DOCUMENTS

| | | |
|---|---|---|
| EP | 1092757 | 4/2001 |
| EP | 1092757 A1 * | 4/2001 |

OTHER PUBLICATIONS

Crivello, J. V., Lee, J. L. and Conlon, D. A. (1988), Developments in the design and applications of novel thermal and photochemical initiators for cationic polymerization. Makromolekulare Chemie. Macromolecular Symposia, 13-14. abstract only.*

Masamitsu Shirai et al. Photoacid and photobase generators: Chemistry and applications to polymeric materials Review Article Progress in Polymer Science, vol. 21, Issue 1, 1996, pp. 1-45.*

International Search Report dated Feb. 26, 2010.

* cited by examiner

*Primary Examiner* — Sanza McClendon
(74) *Attorney, Agent, or Firm* — Sofer & Haroun, LLP

(57) ABSTRACT

A curable composition has an olefin polymer including hydrolysable silane groups on its main chain; and to a latent compound suitable for releasing a curing catalyst under the action of a rise in temperature and/or actinic radiation.

23 Claims, No Drawings

CURABLE COMPOSITION COMPRISING A SILANE-GRAFTED POLYMER AND A LATENT COMPOUND

RELATED APPLICATION

This application claims the benefit of priority from French Patent Application No. 08 58920, filed on Dec. 22, 2008, the entirety of which is incorporated by reference.

BACKGROUND

1. Field of the Invention

The present invention relates both to a curable composition comprising an olefin polymer having hydrolysable silane groups and a latent compound, and to a method of fabricating a cured article from said curable composition.

The invention applies typically, but not exclusively, to fabricating cured articles of the type comprising an insulating layer on an electrical and/or optical cable, or of the type comprising a tube or a pipe for transporting water, oil, or gas.

2. Description of the Related Art

Present techniques for curing polymer compositions that are based on a polyolefin that includes hydrolysable silane groups make use of curing catalysts of the tin salt type, such as, for example dibutyl tin dilaurate (DBTDL). Nevertheless, those catalysts are harmful for the environment and, according to forthcoming regulations, they are going to need to be replaced by catalysts that are less polluting.

To mitigate that drawback, document EP-1 256 593 proposes curing a polyethylene-based composition by using a curing catalyst comprising an aromatic sulfonic acid ArSO$_3$H or a precursor thereof, where precursors are compounds that are suitable for being converted into aryl sulfonic acid by hydrolysis. Nevertheless, aromatic sulfonic acid and the precursors thereof are compounds that are very sensitive to moisture. As a result their storage and utilization time is very limited. Furthermore, that catalyst does not guarantee that no gel forms during the extrusion step, as a result of premature catalysis of curing in an extruder.

OBJECT AND SUMMARY OF THE INVENTION

The Object of the present invention is to mitigate the drawbacks of the prior art, in particular by proposing a composition based on a curable polyolefin that is insensitive to moisture and that is ecological, and that can be implemented with any type of polyolefin and at temperatures that are relatively high.

The present invention provides a curable composition comprising:
  an olefin polymer (polyolefin) including hydrolysable silane groups on its main chain; and
  a latent compound suitable for releasing a curing catalyst under the action of a rise in temperature and/or actinic radiation.

The term "curing catalyst" is used to mean a catalyst for hydrolyzing and condensing silanol functions.

The polymer of the invention comprises a main chain having a linear or branched sequence of component units situated between two terminal groups at the ends of said main chain. The ends of the main chain preferably do not include hydrolysable silane groups.

The polymer having hydrolysable silane groups on its main chain is referred to below as a "silane-grafted polymer".

The term "polymer" is used in general manner to both homopolymers and copolymers. The olefin polymer, or polyolefin, of the invention may thus be a homopolymer or a copolymer of olefin, and in particular it may be a thermoplastic polymer or an elastomer. Preferably, the olefin polymer is an ethylene polymer or a propylene polymer.

As examples of ethylene polymers, mention may be made of linear low density polyethylene (LLDPE), low density polyethylene (LDPE), medium density homo-polyethylene (MDPE), high density polyethylene (HDPE), copolymers of ethylene and vinyl acetate (EVA), copolymers of ethylene and butyl acrylate (EBA), methyl acrylate (EMA), 2-hexylethyl acrylate (2HEA), copolymers of ethylene and of alpha-olefins such as, for example, polyethylene-octene (PEO), copolymers of ethylene and propylene (EPR) such as for example ethylene propylene diene monomer terpolymers (EPDM), and mixtures thereof.

Naturally, the composition of the invention may comprise at least one olefin polymer including hydrolysable silane groups on its main chain, i.e. the composition may comprise a mixture of a plurality of olefin polymers having hydrolysable silane groups on their main chains.

In addition, the composition may optionally include polymers of types other than the olefin polymers of the invention (i.e. an olefin polymer having hydrolysable silane groups on its main chain).

When the curable composition of the invention includes other types of polymer, different from the olefin polymers, it may comprise at least 50 parts by weight of olefin polymers of the invention or 100 parts by weight of polymer in said composition, and preferably at least 80 parts by weight of olefin polymers of the invention or 100 parts by weight of polymer in said composition.

When the curable composition of the invention does not have other types of polymer that are different from olefin polymers including hydrolysable silane groups on their main chain, it is then made up solely of one or more olefin polymers of the invention as polymer in said composition.

The hydrolysable silane groups may be alkoxysilane groups and/or carboxysilane groups, preferably alcoxysilane groups.

By way of example, the silane-grafted polymer may be obtained by grafting vinyl alcoxysilane on at least one olefin polymer (or polyolefin) as described above.

The silane-grafted polymer may also be obtained by in situ copolymerization of at least one olefin monomer, preferably at least one ethylene monomer, with a vinyl alcoxysilane. More particularly, mention may be made of copolymers of ethylene and vinyl silane (EVS).

The content of the latent compound in the composition may lie in the range 50 ppm to 50,000 ppm, and preferably in the range 100 ppm to 5000 ppm. The abbreviation "ppm" in the present description means "parts per million, by weight".

The latent compound, or in other words the latent curing catalyst, that is suitable for releasing a curing catalyst under the action of a rise in temperature and/or of actinic radiation may be defined in several variants.

In a first variant, the latent compound is an ionic compound suitable for releasing an acid, in particular a strong acid, as a curing catalyst. The latent compound is then referred to as an ionic acid generator.

The acid suitable for being released may preferably be a Brønsted acid or a Lewis acid.

When the curing catalyst is a Brønsted acid, the latent compound may be an onium salt. The onium salt may be selected from: salts of triarylsulfonium; aryldiazonium; diarylhalonium such as, for example, diaryliodonium, diarylchloronium, or diarylbromonium salts; triarylselenium; triarylsulfoxonium; arylarsonium; arylphosphonium, pyrylium;

and thiopyrylium; or a mixture thereof. The onium salt anion is preferably selected from $BF_4^-$, $PF_6^-$, $AsF_6^-$, and $SbF_6^-$.

When the curing catalyst is a Lewis acid, the latent compound may be an organometallic salt. By way of example, the organometallic salt may be a ferrocenium salt.

In a second variant, the latent compound is a non-ionic compound suitable for releasing an acid, in particular a strong acid, as a curing catalyst. The latent compound is then referred to as a non-ionic acid generator.

In a first family of compounds, the acid suitable for being released may be a sulfonic acid, in particular of the alkyl sulfonic acid type, the aryl sulfonic acid type, or the aryl-alkyl sulfonic acid type. Under such circumstances, the latent compound is selected from: alpha-sulfonyloxy ketones; alpha-hydroxymethylbenzoin sulfonates; nitrobenzyl tosylates; aryl diazido naphthaquinone-4-sulfonates; alpha-sulfonyl acetophenones; alkyl 2,4-dihydroxy benzophenone sulfonates; N-hydroxyamide sulfones; and oxime tosylates; or a mixture thereof.

In a second family of compounds, the acid suitable for being released may be hydrochloric acid. Under such circumstances, the latent compound suitable for releasing hydrochloric acid may be selected from chlorinated triazines and derivatives thereof, such as for example bis-trichloromethyl-s-triazine, and chlorinated acetophenones and derivatives thereof, such as for example 4-phenoxy-alpha, alpha-bis-dichloroactophenone.

In a third variant, the latent compound is an ionic compound suitable for releasing a base, in particular a strong base, as a curing catalyst. This latent compound is then referred to as an ionic base generator.

The base suitable for being released may preferably a tertiary amine. Under such circumstances, the latent compound suitable for releasing a tertiary amine may be selected from: ammonium salts of alpha-ketocarboxylic acids; ammonium salts of carboxylic acids carrying an aromatic group such as for example alpha-naphthyl acid dimethylbenzyl ammonium salts or anthracene-9-carboxylic acid diazabicycloundecene salts; salts of N-(benzophenone methyl)-tri-N-alkyl-ammonium triphenyl alkyl-borates; salts of benzhydryl ammonium; and iodides of trialkyl fluorenyl ammonium; or a mixture thereof.

In a fourth variant, the latent compound is a non-ionic compound suitable for releasing a base, in particular a strong base, as a curing catalyst. This latent compound is then referred to as a non-ionic base generator.

The base suitable for being released may preferably be a tertiary amine.

The tertiary amine may more particularly be an amidine, which may in particular be selected from: diazabicylooctanes; N-alkyl-morpholines; tetramethyl guanidines (TMG); diazabicylononenes (DBN); and diaza-bicyloundecenes (DBU). Under such circumstances, the latent compound suitable for releasing an amidine may be selected from diazabicylononanes and diazabicylo-undecanes.

Other latent compounds suitable for releasing a tertiary amine may also be mentioned, these latent compounds being for example hindered tertiary amines. Such hindered tertiary amines may in particular be 4-(methylthiobenzoyl)-1-morpholino-ethane, or (4-morpholino-benzol)-1-benzyl-1-dimethyl-amino propane.

Amongst the ionic or non-ionic acid or base generators, it is the non-ionic acid or base generators that are preferred since they present better physiochemical compatibility with the silane-grafted polymer of the invention, such as in particular better solubility in said polymer.

The composition of the invention may include other compounds well known to the person skilled in the art, such as for example flame retardant fillers or photosensitizers.

The invention also provides a method of fabricating a cured article.

In a first variant, the method of fabricating a cured article comprises the steps consisting in:
i) heating the composition as defined above in order to release the curing catalyst of the latent compound; and
iii) curing the composition obtained in step i).

Curing step iii) of the method of the invention may be performed conventionally in the presence of moisture and at controlled temperature.

In a particular implementation, the heating step i) is performed at the extrusion head of an extruder or after extrusion of the composition.

In a second variant, the method of fabricating a cured article comprises the step consisting in:
ii) exposing the composition as defined above to actinic radiation in order to release the curing catalyst of the latent compound, the actinic radiation preferably having a wavelength lying in the range 150 nanometers (nm) to 800 nm, preferably a wavelength lying in the range 185 nm to 800 nm (UV-visible) and still more preferably a wavelength lying in the range 185 nm to 400 nm (UV); and
iii) curing the composition obtained in step ii).

Curing step iii) of the method of the invention may be performed conventionally in the presence of moisture and at controlled temperature.

In a particular implementation, exposure step ii) is performed after extruding the composition.

In a third variant, the method of fabricating a cured article comprises, above-described steps i) and ii) in any order, and the step consisting in:
iii) curing the composition obtained at the preceding step.

Curing step iii) of the method of the invention may be performed conventionally in the presence of moisture and at controlled temperature.

The term "in any order" means that step i) may be performed before, together with, or after step ii).

Thus, in the method of the invention, whatever the variant of the method that is taken into account, the curing catalyst needed for the curing reaction is produced in situ, in the composition.

The latent compound may easily be selected depending on the temperature and/or the wavelength of the actinic radiation needed for releasing the curing catalyst.

A method of determining the temperature at which the catalyst will be released, or the start of release temperature, may be performed conventionally by differential scanning calorimetry (DSC) under a nitrogen atmosphere, using a temperature ramp-up of 10° C. per minute (° C./min). The method is based on the principle of the reaction for thermally initiating the polymerization reaction of an epoxy following the thermal release of the acid or basic curing catalyst coming from the latent compound. The latent compound is typically solubilized (1% by weight) in a dilution liquid of the liquid epoxy type. The epoxy needs to be stable at a temperature that is high enough to avoid decomposing before the latent compound releases the catalyst in situ. An example of liquid epoxy may be the polypropylene glycol epoxy sold by the supplier Dow under the reference DER 736, said epoxy being stable up to a temperature of 200° C. The polymerization of the epoxy as catalyzed by the curing catalyst coming from the latent compound is an exothermal reaction. Consequently, the exothermal peak formed during the polymerization reaction as a result of said catalyst is easily identifiable on the DSC analysis curve. The temperature at which the curing catalyst begins to be released is thus identifiable on the basis of the exothermal peak that is formed. By way of example, the iodonium salt sold by the supplier Momentive Performance under the reference UV9390C is suitable for releasing $HAsF_6$ (Brønsted acid) from 128° C., that being the temperature at which epoxy begins to polymerize when performing the above-mentioned method.

The method of determining the wavelength at which the catalyst will be released is conventionally performed using a UV-visible absorption spectrophotometer. The latent compound, or in other words the latent photoinitiator, is diluted in a solvent that is inert and transparent in the wavelength range under consideration (185 nm to 800 nm) such as acetonitrile. The solution is subjected to monochromatic radiation scanning through the wavelength range 185 nm to 800 nm. The intensity of light that is transmitted is measured so as to deduce the fraction of light that is absorbed as a function of wavelength (absorption spectrum). The absorption maximum that is identified in the absorption spectrum that is obtained serves to indicate that the latent photoinitiator is suitable for releasing a curing catalyst at said absorption maximum. Thus, the UV-visible light source(s) is/are selected as a function of the absorption maximum. Conversely, the latent photoinitiator may be selected as a function of the UV-visible light source(s) that is/are commercially available.

Prior to step i) or ii), the composition may be mixed at a temperature such that the polymer is in the molten state and such that said temperature is below the compound catalyst release temperature. The term "molten state" designates a state in which the silane-grafted polymer of step i) is in a malleable state. This malleable state, which is well known to the person skilled in the art, may conventionally be achieved when the polymer in question is heated to a temperature that is approximately equal to or greater than its melting temperature when the polymer is thermoplastic.

In addition, the compound may be selected as a function of the polymer preparation temperature so as to avoid thermally releasing the curing catalyst while the silane-grafted polymer is in the molten state.

When the method includes said prior mixing step, as mentioned above, this step may be performed in an extruder.

The silane-grafted polymer of the composition of the present invention may be prepared by methods that are well known to the person skilled in the art under the names Monosil® method and Sioplas® method.

With the Monosil® method, the composition of the invention is obtained from a mixture M1 comprising reagents suitable for obtaining the silane-grafted polymer together with the latent compound of the invention. The mixture M1 is heated to a temperature that is sufficient for obtaining a silane-grafted polymer (grafting step), and thus a composition in accordance with the invention. The following steps are those described in accordance with the method of the invention.

When using the Sioplas® method, the composition of the invention is obtained from a mixture M2 comprising reagents for obtaining the silane-grafted polymer. The mixture M2 is heated to a temperature that is sufficient for obtaining a silane-grafted polymer (grafting step). Thereafter, the latent compound of the invention is incorporated in the mixture M2, thus obtaining a composition in accordance with the invention. The following steps are those described in accordance with the method of the invention.

The invention also provides a cured article obtained from the composition of the invention or obtained by the method of the invention.

This article may be in the form:
of an insulating layer for an electrical and/or optical cable; or
of a tube or a pipe, such as for example pipes for hydronic heating, water feed pipes, gas or oil transport pipes in off-shore installations, . . . etc.

Other characteristics and advantages of the present invention appear in the light of the following examples, said examples being given by way of non-limiting illustration.

DETAILED DESCRIPTION

EXAMPLES

Preparing Compositions

The compositions 1 to 6' were prepared having the ingredients set out in Table 1 below.

TABLE 1

| | Composition | | | | | | | |
|---|---|---|---|---|---|---|---|---|
| | 1 | 1' | 2 | 3 | 4 | 5 | 6 | 6' |
| EVS (% in weight) | 98 | 95 | — | 98 | — | 44 | — | — |
| Silane-grafted LLDPE (% in weight) | — | — | 98 | — | 98 | — | 36 | 37 |
| Flame retardant filler (% in weight) | — | — | — | — | — | 52 | 60 | 61 |
| Master-batch (% in weight) | 2 | 5 | 2 | 2 | 2 | 4 | 4 | 2 |
| DBTDL (ppm) | — | 350 | — | — | — | — | — | — |
| DBTm (ppm) | — | — | — | — | — | — | — | 75 |
| PAG (ppm) | 1000 | — | 1000 | — | — | — | — | — |
| PBL (ppm) | — | — | — | 1000 | 1000 | 2000 | 2000 | — |
| Photo-sensitizer (ppm) | — | — | — | 1000 | 1000 | 2000 | 2000 | — |

The origins of the ingredients given in Table 1 are as follows:
EVS corresponds to the ethylene-vinyl-silane copolymer sold by the supplier Borealis under the name LE4421;
silane-grafted LLDPE corresponds to the linear low density polyethylene sold by the supplier Exxon Mobil Chemical under the name LL4004 grafted with vinyl-trimethoxy-silane in the presence of dicumyl peroxide in application of the protocol described in patent document FR 2 030 899;
flame retardant filler corresponds to $Mg(OH)_2$ sold by the supplier Albemarle under the reference Magnifin H10;
DBTDL corresponds to dibutyl tin dilaurate sold by the supplier Reagens under the reference Reatinor 932;
DBTm corresponds to dibutyl tin bis(2-ethyle hexyl mercapto acetate) sold by the supplier Crompton under the reference Mark 17M;
PAG is an ionic photo-acid generator suitable for releasing a Brønsted acid, sold by the supplier Lamberti under the reference Esacure 1187SA;
PBL is a non-ionic base generator suitable for releasing a tertiary amine, sold by the supplier Ciba under the reference CGI 113; and
photosensitizer corresponds to isopropyl thioxanthone sold by the supplier Rahn under the reference Genocure-ITX.

Initially, various master batches were prepared as follows:
when the latent compound was PAG, 5% by weight of latent compound was incorporated in an EVS polymer matrix when EVS was to be cured (composition 1), or in a silane-grafted LLDPE matrix when silane-grafted LLDPE was to be cured (composition 2);
when the latent compound was PBL, 5% by weight of latent compound together with 5% by weight of photosensitizer were added either in an EVS matrix when non-filled EVS was to be cured (composition 3) or filled EVS (composition 5) was to be cured, or else into a non-filled silane-grafted LLDPE matrix when a non-filled silane-grafted LLDPE matrix was to be cured (composition 4), or a filled silane-grafted LLPDE (composition 6); and
when the catalyst was of the dibutyl tin salt type, 0.7 or 0.36 parts by weight of said catalyst were incorporated in a (non-silane grafted) LLDPE matrix respectively when EVS was to be cured (composition 1') or when filled silane-grafted LLDPE (composition 6') was to be cured.

Thereafter, the various master batches were added via the hopper of an extruder into an EVS or a silane-grafted LLDPE mixture complying with the compositions listed in Table 1. The temperature profile of the extruder enabled the resulting polymer mixture to be in the molten state. The maximum temperature of the profile was also less than the temperature for releasing the curing catalyst for the PAG and PBL latent compounds (compositions 1, 2, 3, 4, 5, and 6). More particularly, the temperature profile of the extruder was as follows: 120° C.-150° C.-160° C., with a temperature at the extruder head of 170° C. At 170° C., the temperature stability of the PAG and PBL of latent compounds is sufficient to avoid them releasing their respective curing catalysts while the compositions are mixing in the extruder. The various quantities of master batches for the compositions 1 to 6' respectively are given in Table 1. The contents of latent compounds, of dibutyl tin salt, and of photosensitizer for the compositions 1 to 6' are also given in Table 1.

Extruding the Compositions and UV Irradiation

The step of extruding the various compositions 1 to 6' was performed at a speed of 10 meters per minute (m/min) with a thickness of 300 micrometers (μm) of said extruded composition being deposited around a conductive copper wire having a cross-sectional area of 0.85 square millimeters (mm$^2$).

Thereafter, solely for those compositions that include a latent compound, the resulting isolated wire was immediately irradiated with ultraviolet (UV) radiation (first UV treatment) at a wavelength lying in the range 150 nm to 550 nm, at ambient temperature, using an oven of the HP6 type sold by the supplier Fusion UV Systems and fitted with a "D" type medium-pressure mercury vapor bulb having a power of 200 watts per centimeter (W/cm) and a rear reflector module. In order to improve the effectiveness of the catalyst coming from the latent compound, it might be necessary to use a UV post-treatment step. Such a step can be performed on the isolated wire at ambient temperature after the extrusion step. In the context of the examples described, UV post-treatment consisted in passing the isolated wire at 10 m/min ten times through the UV oven.

Compositions that have been subjected to a first UV treatment, and possibly to a UV post-treatment, are specified in Table 2 below.

Naturally, increasing the number of lamps and their power can also serve to avoid performing UV post-treatment. The number of lamps and their power can readily be selected by the person skilled in the art in order to obtain optimum curing as a function of the duration of the irradiation and as a function of the thickness of the composition to be irradiated.

Curing the Extruded Compositions

Curing conditions are given in Table 2 below. They were of two types:
so-called "forced" curing, under sauna conditions, i.e. for a period of 48 hours (h) at 80° C. with 100% relative humidity; and
so-called "non-forced" curing under self-curing conditions, i.e. for a period of 2 days (d) at 25° C. and with 50% relative humidity.

Characterizing the Degree of Curing

Once the cured compositions have been subjected to sauna conditions or to self-curing conditions (see Table 2), the degree of curing was characterized using methods that are well known to the person skilled in the art.

For filled compositions (compositions 5, 6, and 6'), the selected method was that of measuring creep while hot under load. For non-filled compositions (compositions 1, 1', 2, 3, and 4), the level of curing was quantified by measuring the content of insolubles.

Hot Creep Under Load

Standard NF EN 60811-2-1 describes measuring creep while hot of a material under load. The corresponding test is commonly referred to as a Hot Set Test.

Specifically, it consists in weighting one end of a test piece of material with a weight that corresponds to applying a stress equivalent to 0.2 megapascals (MPa) and in placing the assembly in a stove heated to 200° C.±1° C. for a duration of 15 min. At the end of that time, the elongation of the test piece while hot and under load is measured, and is expressed as a percentage. The suspended weight is then removed, and the test piece is kept in the stove for five more minutes. The remaining permanent elongation, also known as remanence, is also measured and expressed as a percentage.

It should be recalled that the greater the extent to which a material has cured, the smaller the resulting values of elongation and remanence. It is also specified that with a test piece that breaks during the test, under the combined action of the mechanical stress and of temperature, then the result of the test is logically considered as being a failure.

Insolubles Content

Standard ASTM D2765-01 describes measuring insolubles content. It is recalled that two of the main characteristics of a fully cured material are firstly its infusibility, and secondly its insolubility. A material that is only partially cured naturally comprises some proportion of insoluble material (also known as gel) and some proportion of soluble material (also known as sol). The greater the insolubles content, the better the curing of the material.

Specifically, almost exactly 0.5 grams (g) of the sample under test (M1) is placed in an Erlenmeyer flask containing 100 g of xylene. The flask containing the xylene and the material is then closed and raised to 110° C. under magnetic stirring for a duration of 24 h. The content of the flask is then filtered while hot using a metal grid with a mesh size of 120 μm×120 μm. The solid residue that is obtained is then dried in a stove at 100° C. for 24 h, and then weighed (M2). The insolubles content expressed as a percentage is then calculated by taking the ratio of the masses M2×100/M1.

Table 2 summarizes the hot creep and insolubles content results obtained on the samples under consideration.

TABLE 2

| Composition | UV treatment (first UV treatment) | UV post-treatment | Curing conditions | Hot set test Elongation under load (%) | Remanence (%) | Insolubles content (%) |
|---|---|---|---|---|---|---|
| 1 | YES | NO | SELF-CURING | 105 | 30 | 70 |
| 1' | NO | NO | SELF-CURING | FAIL | FAIL | <5 |
| 2 | YES | NO | SAUNA | NM | NM | 40 |
|   | YES | YES | SAUNA | NM | NM | 59 |
| 3 | YES | NO | SAUNA | NM | NM | 23 |
|   | YES | YES | SAUNA | NM | NM | 32 |
| 4 | YES | NO | SAUNA | NM | NM | 41 |
|   | YES | YES | SAUNA | NM | NM | 57 |
| 5 | YES | YES | SELF-CURING | 95 | 25 | NM |
|   | YES | YES | SAUNA | 75 | 15 | NM |
| 6 | YES | YES | SELF-CURING | 40 | 5 | NM |
|   | YES | YES | SAUNA | 30 | 0 | NM |
| 6' | NO | NO | SELF-CURING | FAIL | FAIL | NM |

NM = Not measured

It should firstly be observed that the insolubles content obtained for composition 1 (EVA+PAG) is advantageously very high (70%). Under the same conditions, catalysis using the tin salt is much less effective (composition 1').

Composition 2 (silane-grafted LLDPE+PAG) and composition 4 (silane-grafted LLPDE+PBL) behaves identically. The insolubles contents of the samples obtained after sauna with or without UV post-treatment are very similar. With both compositions, there can be seen a positive effect of UV post-treatment on the curing density of the insulation.

Composition 3 (EVA+PBL) presents results that are satisfactory. It can be seen that the insolubles content is better when UV post-treatment is performed.

With filled compositions, i.e. composition 5 (EVS+Mg (OH)$_2$+PBL) and composition 6 (silane-grafted LLDPE+Mg (OH)$_2$+PBL), PBL curing is found to be particularly effective, as shown by the small elongation and remanence values (creep at 200° C.) UV post-treatment also serves to improve curing effectively.

Finally, compositions 5 and 6, after UV post-treatment, are self-curing, unlike composition 6' (compared with composition 6) in which self-curing does not occur after 48 h, nor even after several tens of days. There can be seen a beneficial effect of the latent curing catalyst (PAG or PBL) compared with a tin salt (DBTDL or DBTm) which has an effect not only on the toxicity of the mixture obtained in this way, but also on the conditions under which the mixture is cured.

What is claimed is:

1. A curable composition comprising:
    an olefin polymer including hydrolysable silane groups on its main chain; and
    a latent compound releasing a curing catalyst under the action of a rise in temperature and/or actinic radiation, the curing catalyst being a base.

2. A composition according to claim 1, wherein the olefin polymer is an ethylene polymer.

3. A composition according to claim 1, wherein the hydrolysable silane groups are alkoxysilane groups and/or carboxysilane groups.

4. A composition according to claim 1, wherein the latent compound content in the composition lies in the range 50 ppm to 50,000 ppm.

5. A composition according to claim 1, wherein the latent compound is an ionic compound suitable for releasing a base as a curing catalyst.

6. A composition according to claim 5, wherein the base is a tertiary amine.

7. A composition according to claim 6, wherein the latent compound is selected from the group consisting of: ammonium salts of alpha-ketocarboxylic acids; ammonium salts of carboxylic acids carrying an aromatic group; salts of N-(benzophenone methyl)-tri-N-alkyl-ammonium triphenyl alkylborates; salts of benzhydrl ammonium; and iodides of trialkyl fluorenyl ammonium; or a mixture thereof.

8. A composition according to claim 1, wherein the latent compound is a non-ionic compound suitable for releasing a base as a curing catalyst.

9. A composition according to claim 8, wherein the base is a tertiary amine.

10. A composition according to claim 9, wherein the tertiary amine is selected from the group consisting of: diazabicylooctanes; N-alkyl-morpholines; tetramethyl guanidines; diazabicylononenes; and diazabicyloundecenes.

11. A composition according to claim 9, wherein the latent compound is selected from the group consisting of diazabicylononanes; and diazabicyloundecanes.

12. A composition according to claim 9, wherein the latent compound is selected from the group consisting of 4-(methyl thio benzoyl)-1-morpholino ethane; and (4-morpholino benzol)-1-benzyl-1-dimethylamino propane.

13. A method of fabricating a cured article, the method comprising the steps consisting in:
    i) heating the composition as defined in claim 1 in order to release the curing catalyst of the latent compound; and
    iii) curing the composition obtained in step i).

14. A method according to claim 13, wherein the heating step i) is performed at the extrusion head of an extruder or after extrusion of the composition.

15. A method of fabricating a cured article, the method consisting in the steps of:
    ii) exposing the composition as defined in claim 1 to actinic radiation in order to release the curing catalyst of the latent compound; and
    iii) curing the composition obtained in step ii).

16. A method according to claim 15, wherein step ii) of exposure of actinic radiation is performed under radiation having a wavelength lying in the range 185 nm to 400 nm.

17. A method according to claim 15, wherein exposure step ii) is performed after the composition has been extruded.

18. A composition according to claim 1, wherein said composition is implemented as an insulating layer, as a cured article, for either one of an electrical cable or fiber optic cable.

19. A curable composition comprising:
an olefin polymer including hydrolysable silane groups on its main chain; and
a latent compound releasing a curing catalyst that under the action of a rise in temperature and/or actinic radiation, the curing catalyst being a base, and wherein the composition comprising said olefin polymer and said latent compound is extrudable.

20. A curable composition comprising:
an olefin polymer including hydrolysable silane groups on its main chain; and
a latent compound releasing a curing catalyst that under the action of a rise in temperature and/or actinic radiation, the curing catalyst being a base, and wherein the composition comprising said olefin polymer and said latent compound is an extrudable composition for forming a cured article.

21. A curable composition comprising:
an ethylene polymer including hydrolysable silane groups on its main chain; and
a latent compound releasing a curing catalyst that, under the action of a rise in temperature and/or actinic radiation, the curing catalyst being a base.

22. A curable composition comprising:
an olefin polymer including hydrolysable silane groups on its main chain; and
a latent compound releasing a curing catalyst that under the action of a rise in temperature and/or actinic radiation, the curing catalyst being a tertiary amine.

23. A composition according to claim 1, wherein the released base is different from the latent compound.

* * * * *